United States Patent [19]

Bennett et al.

[11] Patent Number: 4,981,111
[45] Date of Patent: Jan. 1, 1991

[54] CIRCULATING FLUIDIZED BED COMBUSTION REACTOR WITH FLY ASH RECYCLE

[75] Inventors: Douglas L. Bennett, Allentown; David W. Studer, Wescosville, both of Pa.

[73] Assignee: Air Products and Chemicals, Inc., Allentown, Pa.

[21] Appl. No.: 442,032

[22] Filed: Nov. 28, 1989

[51] Int. Cl.⁵ .............................................. F23D 1/00
[52] U.S. Cl. ................................. 110/347; 110/106; 110/245
[58] Field of Search ............... 122/4 D; 110/245, 106, 110/347, 345

[56] References Cited

U.S. PATENT DOCUMENTS

| | | | |
|---|---|---|---|
| 3,951,081 | 4/1976 | Martin et al. | 110/106 |
| 4,111,158 | 9/1978 | Reh et al. | 122/4 D |
| 4,259,911 | 4/1981 | Jones | 110/106 |
| 4,532,872 | 8/1985 | Anderson | 110/245 |
| 4,829,912 | 5/1989 | Alliston et al. | 122/4 D |

Primary Examiner—Henry C. Yuen
Attorney, Agent, or Firm—Keith D. Gourley; James C. Simmons; William F. Marsh

[57] ABSTRACT

A circulating fluidized bed combustion reactor and a process for combusting a solid hydrocarbon fuel in the same wherein fly ash recycling is utilized to regulate heat transfer and to minimize erosion of reactor operating components. The process comprises introducing a solid hydrocarbon fuel and an oxygen-containing gas into a combustion zone which is surrounded by a plurality of adjoining cooling tubes containing a circulating fluid; combusting the fuel in the presence of the oxygen-containing gas within a predetermined temperature range thereby forming hot exhaust gases containing solid particles; discharging the hot exhaust gases containing the solid particles from the combustion zone and cooling the exhaust gases by indirect heat exchange against the cooling tubes; separating the resultant cooled solid particles into at least a first portion which is recycled into the combustion zone and a second portion having an average particle size smaller than the first portion; separating the second portion into a gas stream substantially free of particles and a concentrated stream of particles; recycling the concentrated stream of particles into the combustion zone at a rate sufficient to maintain the predetermined temperature range within the combustion zone and exhausting the gas stream which is substantially free of solid particles.

6 Claims, 1 Drawing Sheet

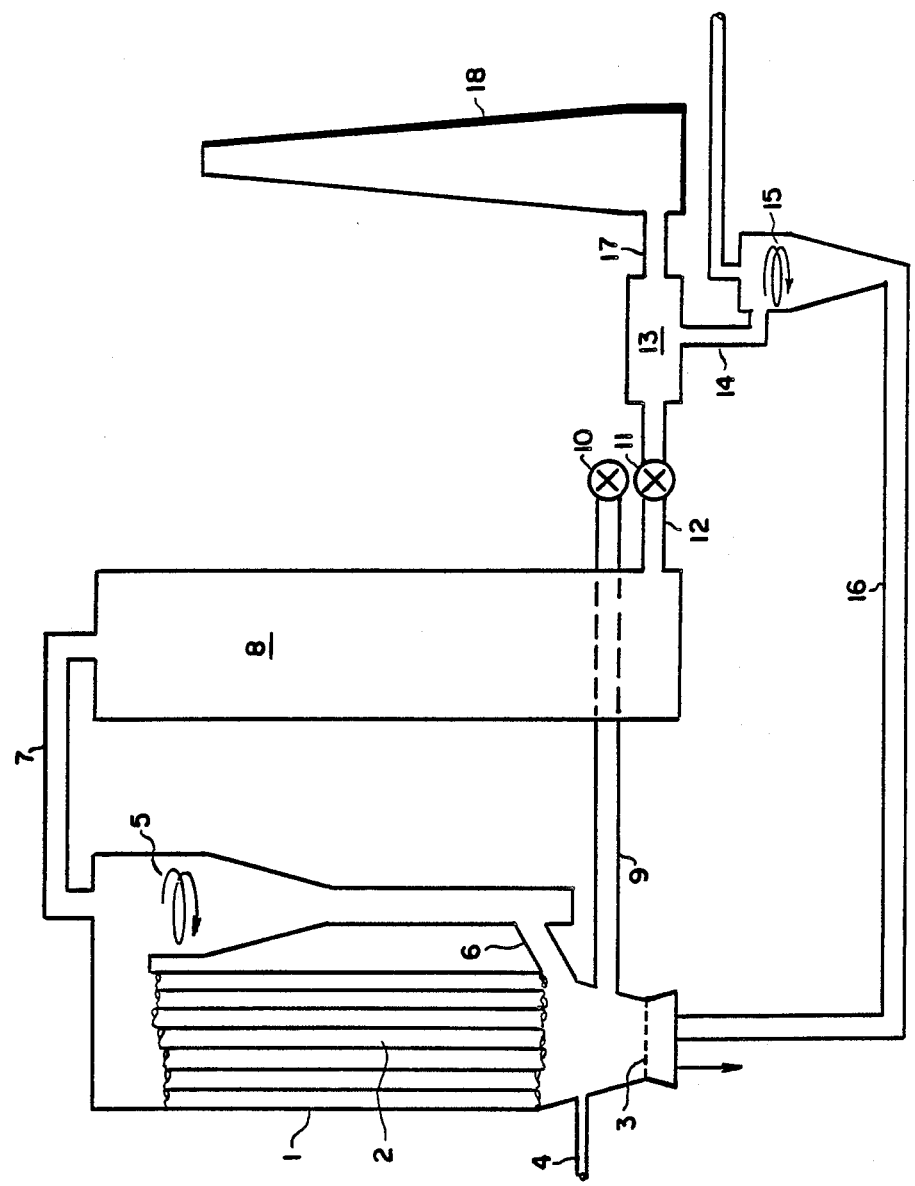

CIRCULATING FLUIDIZED BED COMBUSTION REACTOR WITH FLY ASH RECYCLE

TECHNICAL FIELD OF THE INVENTION

The present invention relates to a circulating fluidized bed combustion reactor and a process for combusting a solid hydrocarbon fuel in the same wherein fly ash recycling is utilized to regulate heat transfer and to minimize erosion of reactor surfaces.

BACKGROUND OF THE INVENTION

Circulating fluidized bed combustion (CFBC) reactors are being utilized in an increasing number of applications including the generation of steam wherein fossil fuels such as coal are used as a fuel source. CFBC reactors typically utilize fuels having a lower energy content than are used in standard boiler furnaces. CFBC reactors are favored over conventional boiler systems because the combustion flue gas can be desulfurized economically within the combustion chamber before being emitted into the atmosphere.

In a typical process which employs a CFBC reactor for producing and recovering heat energy, a bed of solid particles is initially introduced into, and then maintained in the reactor in order to sustain a nearly uniform temperature throughout the combustion bed. The bed of solid particles adsorbs heat from the combusting fuel source and serves as a means of conveying and transmitting such heat to a plurality of adjoining cooling tubes containing a circulating fluid which surround the reactor combustion zone. Typically, the bed of solid particles comprises ash particles produced by combustion of a fuel source although the bed may additionally comprise sand or other materials introduced into the reactor to assist in the maintenance of the desired reactor temperature profile. A solid fuel and an oxygen-containing gas are introduced into the reactor and are combusted thereby releasing a substantial amount of heat and forming hot exhaust gases containing ash particles. The oxygen-containing gas, along with the gaseous products of combustion, fluidize the bed of particles within the combustion zone thereby providing intimate mixing of the combusting fuel and combustion particles.

A first portion of these particles impacts the walls of the reactor and typically falls downward to the bottom of the reactor simultaneously transmitting heat to the water or other fluid contained within the heat transfer tubes surrounding the combustion zone. A second portion of the particles is carried upward within the reactor along with the exhaust gases. The major fraction of the upward flowing stream of particles is captured in a cyclone or other particulate collection device and is typically returned to the combustion zone. The remaining fraction of particles which is not captured by the cyclone is carried by the exhaust gases into a convection section. Such particles are known as fly ash.

Fly ash must be separated from the flue gas prior to expulsion of the flue gas into the atmosphere. This separation step is typically accomplished by use of fabric filters or other suitable apparatus. For coals which produce large quantities of fly ash, the loss of such fly ash from the combustion zone causes the bed density within the combustion zone to drift below the operating range which is most effective for promoting heat transfer rendering a reactor temperature which is too high to conduct efficient removal of pollutants.

The heat released by the combusting fuel is quickly absorbed by the large quantity of solid particles due to the intimate mixing between the burning fuel and the solid particles returning to the bottom of the reactor. While the particles ultimately transfer the heat that they acquire to the walls of the reactor, under optimum conditions only a small temperature change in the reactor is experienced due to the large mass, and therefore, high heat capacity of the circulating particles.

In the case of CFBC reactors, sufficient heat transfer is dependent upon maintaining an adequate concentration of ash particles within the reactor which promotes mixing and heat transfer. When the average ash particle size is too small, ash tends to exit the reactor and cyclone causing a rise in bed temperature. Likewise, If the average ash particle size is too large, insufficient ash particles will be fluidized also causing a temperature fluctuation within the reactor.

Several approaches have been proposed for regulating particle bed density within CFBC reactors in order to minimize temperature fluctuations and enhance heat transfer between the heated flue gas containing ash particles and the cooling tubes surrounding the reactor. For example. U.S. Pat. No. 4.111,158 discloses a method and apparatus for carrying out an exothermic process in which a combustible solid is burned in a fluidized-bed reactor with primary and secondary streams of oxygen-containing combustion-sustaining gas supplied at different levels so that the primary gas acts as the fluidizing gas. The major portion of solid feed is introduced into the space below the secondary gas inlet which is maintained substantially free of internal fixtures and the effluent gases are separated from the entrained solids which are recycled to the bed. Solids withdrawn from the bed are cooled in a fluidized bed cooler and the temperature of the bed is maintained constant by the controlled recirculation of cooled solids thereto from the cooler. The gas heated in the cooler is fed to the bed as secondary gas.

BRIEF SUMMARY OF THE INVENTION

The present invention relates to a circulating fluidized bed combustion (CFBC) reactor and a process for combusting a solid hydrocarbon fuel in such a reactor wherein fly ash, which is typically discarded during the operation of conventional processes, is recycled from the heat recovery section or baghouse of the reactor and returned to the combustion zone for further combustion. The process according to the present invention results in improved reactor performance during steady-state and/or load following conditions allowing for more precise control of the reactor heat transfer coefficient and regulation of reactor operating temperature and bed particle density.

A first aspect of the invention relates to a CFBC reactor which comprises a plurality of adjoining cooling tubes which surround a combustion zone; means for introducing a solid hydrocarbon fuel and an oxygen-containing gas into the combustion zone; means for combusting the fuel in the presence of the oxygen-containing gas within a predetermined temperature range thereby forming hot exhaust gases containing solid particles; means for discharging the hot exhaust gases containing the solid particles from the combustion zone and cooling the exhaust gases by indirect heat exchange against the cooling tubes; means for separating the resultant cooled solid particles into at least a first portion which is recycled into the combustion zone and a second portion having an average particle size smaller than the first portion; means for separating the second portion into a gas stream substantially free of particles and a concentrated stream of particles; means for recycling the concentrated stream of particles into the combustion zone at a rate sufficient to maintain the predetermined temperature range within the combustion zone and means for exhausting the gas stream which is substantially free of solid particles.

Another aspect of the invention pertains to a process for combusting a solid hydrocarbon fuel in a fluidized bed combustion reactor having a plurality of adjoining cooling tubes which surround a combustion zone. The process comprises introducing the solid hydrocarbon fuel and an oxygen-containing gas into the combustion zone; combusting the fuel in the presence of the oxygen-containing gas within a predetermined temperature range thereby forming hot exhaust gases containing solid particles; discharging the hot exhaust gases containing the solid particles from the combustion zone and cooling the exhaust gases by indirect heat exchange against the cooling tubes; separating the resultant cooled solid particles into at least a first portion which is recycled into the combustion zone and a second portion having an average particle size smaller than the first portion; separating the second portion into a gas stream substantially free of particles and a concentrated stream of particles; recycling the concentrated stream of particles into the combustion zone at a rate sufficient to maintain the predetermined temperature range within the combustion zone and exhausting the gas stream which is substantially free of solid particles.

Numerous advantages and benefits accrue from practicing the process and utilizing the CFBC reactor disclosed in the present invention. The present invention provides enhanced control of the operating temperature of the reactor and produces ash having substantially reduced carbon content which results in higher carbon utilization and a potentially more salable by-product. Moreover, the reactor is capable of burning low sulfur, low ash coals which generally do not produce enough ash to develop a stable combustion bed in conventional CFBC reactors.

BRIEF DESCRIPTION OF THE DRAWING

The single Figure is a schematic diagram of a circulating fluidized bed combustion reactor suitable for practicing the process of the claimed invention.

DETAILED DESCRIPTION OF THE INVENTION

The present invention relates to a circulating fluidized bed combustion (CFBC) reactor which provides a substantial improvement in the regulation of reactor bed density and heat transfer between reactor combustion products and the cooling tubes containing circulating fluid which surround the reactor combustion zone. The invention has broad applicability toward use in CFBC reactors of diverse design and size wherein operating conditions such as temperature, energy and ash content of the fuel and the like vary substantially. Conventional CFBC reactors can be easily retrofitted to practice the process of the present invention.

The process according to the present invention comprises recycling fly ash from the heat recovery section or baghouse of a conventional CFBC reactor to the combustion zone which results in improved overall heat transfer and control of the reactor during steady-state and/or load-following conditions. The benefits obtained by practicing the present invention are surprising and unexpected. It must be realized that the fly ash to be recycled according to the present process is obtained by collecting the particles rejected by the reactor cyclone. One of ordinary skill in the art would expect that reintroduction of such previously rejected particles into the combustion zone would provide essentially no beneficial effect on the ability to control the reactor heat transfer coefficient and would create baghouse clogging because such particles would be immediately expelled by the cyclone.

Surprisingly, only a small fraction of the previously rejected fly ash is initially rejected upon reintroduction into the reactor. Calculations demonstrate that 95 to 99% of the recycled fly ash particles will be recycled to the combustion zone by the cyclone during each pass of recycled fly ash through the cyclone. The result is that a modest quantity of fly ash recycling significantly impacts the overall heat transfer performance of the CFBC reactor.

The improved heat transfer and temperature regulation achieved by the present invention contributes to maintaining an efficient combustion process which facilitates compliance with the increasingly strict federal and state environmental clean air standards. For example, the removal of sulfur oxides from combustion flue gas by reaction of sulfur dioxide with calcined limestone is strongly dependent on temperature. Unduly low reactor temperatures result in substantially decreased sulfur capture. If the reaction temperature is too high, the pores of the calcium oxide can sinter and plug before such pores can adsorb sulfur oxides. The observed optimum temperature range for sulfur capture is about 1500° to 1650° F. A rapid decline in sulfur capture is typically experienced outside this preferred temperature range.

The degree to which reactor bed density is optimized for maximum heat transfer at minimum pressure drop is known as "bed quality". Bed quality depends on many factors, few of which are controllable during plant operation. The process of this invention allows for convenient and efficient regulation of reactor bed quality by controlling the size and quantity of particles maintained within the reactor. The recycling of fly ash according to the present invention allows for the convenient control of the reactor temperature and heat transfer coefficient within the optimum range for the particular CFBC reactor.

The recycling of fly ash in combination with classification and removal of bottom ash substantially increases particle density within the bed thereby increasing radiant and convective heat transfer between the combustion particles and the cooling tubes surrounding the combustion zone. The reactor can then be operated in a temperature regime in which hot limestone desulfurization is optimized and erosion of the cooling tubes is minimized.

A CFBC reactor according to the present invention is disclosed in the sole Figure which illustrates a plurality of cooling tubes 1, combustion zone 2, distribution grid 3, cyclone 5, heat recovery unit 8, baghouse 13 and associated conduits for transferring process streams. The combustion zone 2 is constructed entirely of adjoining cooling tubes 1 which are joined by short webs forming a pressure seal. A heat exchange fluid, typically water, is circulated, either continuously or intermittently, to absorb heat from the fluidized bed of combustion particles. The studded tubes near the bottom of the box may optionally be covered with refractory material before beginning operation of the process. The cooling tubes 1 within the combustion zone 2 are the primary heat transfer surfaces whereby the heat adsorbed from the combustion particles can be used to generate steam or can be used in another process.

The CFBC reactor according to the present invention will now be discussed in greater detail. Means for introducing a solid hydrocarbon fuel and an oxygen-containing gas into combustion zone 2 include conduit 4 and distribution grid 3. The optimum size of the fuel will depend on the type used as well as the source of such fuel. For example, a typical average size for coal ranges from about 0.25 inches to about 0.50 inches in diameter. The solid hydrocarbon fuel enters the combustion zone 2 via conduit 4 and is fluidized. Preheated primary air is introduced through distributor grid 3 while secondary air is added at various levels above the grid (not shown). Optionally, limestone can be added to the solids mixture and introduced into the combustion zone for control of emissions, typically sulfur-oxides. Process steps for practicing control of such emissions are well known in the art and are not critical to the practice of this invention.

The reactor further comprises a means for combusting the solid fuel in the presence of the oxygen-containing gas within a predetermined temperature range thereby forming hot exhaust gases containing solid particles. Combustion is effected by any means known in the art including the burning of wood, peat, coke or coal.

The reactor further comprises a means for discharging the hot exhaust gases containing the solid particles from combustion zone 2 and cooling the exhaust gases by indirect heat exchange against the cooling tubes 1. The combustion of the solid hydrocarbon fuel contributes to an overall upward velocity of the combustion particles causing such particles to be placed in contact with the plurality of cooling tubes 1 wherein the circulating fluid within the cooling tubes is warmed by indirect heat exchange with the combustion particles. The reactor is also equipped with a door (not shown) for removing bottom ash which settles during combustion.

The reactor further comprises a means for separating the resultant cooled solid particles into at least a first portion which is recycled into combustion zone 2 and a second portion having an average particle size smaller than the first portion. The average particle size of the second portion ranges from about 50 to 100 microns. The average particle size of the second portion will vary depending upon the particular fuel source combusted and the apparatus utilized to separate the particles. However, the second portion of particles will always have an average particle size less than the first portion. Suitable means include cyclone 5 which classifies particles according to their size. The first portion of particles is recycled into combustion zone 2 via conduit 6.

Throughout the Specification and for the purpose of interpreting the appended claims, it shall be understood that the second portion of particles comprises primarily fly ash. The combustion process produces a large amount of particulate ash solids per unit quantity of fuel source. Consequently, very large amounts of particulate ash solids come into contact with the walls of the reactor which contribute to erosion of reactor heat transfer surfaces and refractory surfaces. As will be discussed herein, fly ash recycle according to the present invention minimizes erosion of reactor surfaces.

The reactor further comprises a means for separating the second portion of particles into a gas stream which is substantially free of particles and a concentrated stream of particles. Means for separating is provided by baghouse 13. Fly ash exiting cyclone 5 via conduit 7 is directed toward baghouse 13 for removal of fly ash from the flue gas wherein a concentrated stream of particles is created. The removal of such particles from the flue gas can be accomplished by conventional methods known in the art including but not limited to the use of fabric filters and electrostatic filters. These particles can be transported into combustion zone 2 via means such as a screw or moving belt system.

In a preferred embodiment, the concentrated stream of particles is passed into cyclone 15 for removal of a fraction of fine particles. The fraction of fine particles is discarded and the resultant concentrated stream of particles is then recycled as disclosed herein.

Optionally, the heated fly ash exiting cyclone 5 may be cooled to a desired extent by passage through heat recovery unit 8 wherein secondary air is prewarmed by indirect heat exchange against the heated fly ash and transferred into combustion zone 2 via conduit 9. Blowers 10 and 11 assist in the transfer of process streams. The cooled fly ash exists heat recovery unit 8 via conduit 12 and enters baghouse 13.

Means for recycling the concentrated stream of particles into combustion zone 2 at a rate sufficient to maintain the predetermined temperature range within the combustion zone is provided by conduits 14 and 16. Flyash is reintroduced into combustion zone 2 at a rate sufficient to maintain the desired temperature range. The desired rate is easily determined by those skilled in the art and will depend on the particular equipment being utilized. Means for withdrawing the exhaust gases which are substantially free of solid particles from the reactor is supplied by conduit 17 which is in flow communication with chimney 1B.

A further aspect of the present invention relates to a process for combusting a solid hydrocarbon fuel in a CFBC reactor having a plurality of adjoining cooling tubes which surround a combustion zone. The process comprises introducing the solid hydrocarbon fuel and an oxygen-containing gas into the combustion zone; combusting the fuel in the presence of the oxygen-containing gas within a predetermined temperature range thereby forming hot exhaust gases containing solid particles; discharging the hot exhaust gases containing the solid particles from the combustion zone and cooling the exhaust gases by indirect heat exchange against the cooling tubes; separating the resultant cooled solid particles into at least a first portion which is recycled into the combustion zone and a second portion having an average particle size smaller than the first portion; separating the second portion into a gas stream substantially free of particles and a concentrated stream of particles; recycling the concentrated stream of particles into the combustion zone at a rate sufficient to maintain the predetermined temperature range within the combustion zone and exhausting the gas stream which is substantially free of solid particles.

The process according to the present invention is discussed with reference to the sole Figure A solid hydrocarbon fuel is introduced into combustion zone 2 via conduit 4. The solids mixture is fluidized and preheated and primary air is introduced through distribution grid 3 while secondary air is added at various levels above the grid (not shown) including conduit 9. Optionally, limestone can be introduced into the reactor for control of emissions.

The fuel is combusted in the presence of the oxygen-containing gas within a predetermined temperature range thereby forming hot exhaust gases containing solid particles. Combustion of the fuel and the oxygen-containing gas occurs throughout the reactor. Combustion is effected by any means known in the art including the burning of wood, peat, coke or coal. Coarse bottom ash is removed via a grid (not shown) located at the bottom of the combustion reactor. The hot exhaust gases containing the solid particles are then expelled from combustion zone 2 and the exhaust gases are cooled by indirect heat exchange against the circulating fluid contained in the plurality of adjoining cooling tubes 1. The circulating fluid is warmed and can be used in the production of steam and in other processes. The solid particles are separated in cyclone 7 into at least a first portion which is recycled into combustion zone 2 for further combustion and a second portion comprising fly ash which has an average particle size less than the first portion.

At least a fraction of the second portion of particles is recycled into combustion zone 2 in order to maintain a substantially constant temperature within the predetermined temperature range. The rate of recycling will depend upon several factors. For example, such rate will depend upon the amount, if any, of inert material such as sand added into the reactor to maintain bed density as well as the amount of bottom ash removed from the reactor per unit time. Prior to recycling, the hot flue gas containing fly ash may optionally be cooled in heat recovery unit 8 by indirect heat exchange against conduit 9 which carries secondary air into combustion zone 2. The transfer of secondary air is assisted by a conventional blower 10. The cooled flue gas containing the fly ash is then transferred to baghouse 13 via conduit 12 wherein the fly ash is removed from the flue gas. The temperature range within the reactor can be conveniently maintained by recycling at least a portion of the concentrated stream of fly ash particles into combustion zone 2 via conduit 16. The exhaust gases which are substantially free of solid particles are expelled from the reactor via conduit 17 and chimney 18.

In a preferred embodiment, the concentrated stream of particles is passed into cyclone 15 prior to being recycled into combustion zone 2. Cyclone 15 separates a fraction of fine particles from the concentrated stream prior to recycling the further concentrated stream into the combustion zone. The fraction of fine particles is typically discarded.

The transfer of heat from the combustion particles to the cooling tubes is caused by a complex combination of convective, conductive and radiative heat transfer mechanisms. The addition of fine fly ash to the fluidized bed impacts heat transfer by increasing the emissivity of the medium and by increasing the average density and specific heat of the fluidized bed. The solids which are most effective in increasing the heat transfer coefficient are those which move freely within the fluidized bed. Such particles move with an overall upwards velocity approximately that of the gas.

Large particles tend to stay near the bottom of the combustion zone. Since much of the lower portion of the combustion zone is covered with refractory, large particles, which do not travel to a height higher than the top of the refractory, do not contribute substantially to the transfer of heat to the cooling tubes. The particles which make up the fly ash may vary substantially in size and the optimum average particle size will be dependent upon the design and operation of the cyclone. For large cyclones, the fly ash may contain particles ranging in size up to 100 microns or more.

The following examples illustrate an operative embodiment of the process and is not intended to limit the scope of the claimed invention.

EXAMPLE 1

A CFBC reactor (90 ft. in height) is operated to produce steam. The unit is designed to receive coal having a heating value of 11,300 BTU/lb. and containing 9.0% ash, 0.4% sulfur and 10% moisture. This coal, when burned under normal conditions, produces fine ash particles having a diameter of about 10 $\mu$m. In order to achieve proper operation of the FBC reactor approximately 75 lbs/ft$^2$ of bed cross section of sand particles are introduced into the unit and the furnace is brought to an operating temperature of about 1600° F. by combusting natural gas. Coal is added gradually until a normal operating condition is achieved whereby 71.3 lbs/hour/ft$^2$ of bed cross section of coal is added at steady state. This rate permits 625 lbs/hour/ft$^2$ of bed cross section of steam to be vaporized. Limestone may be added into the reactor to facilitate desulfurization of the coal. Typically, limestone is added at a rate of 2.5 lbs/ft$^2$ of bed cross section to achieve about 33% conversion of limestone to calcium sulfate. Sand is added as necessary, typically at a rate of 0.2 lbs/hour/ft$^2$ of bed cross section to maintain the particle density suitable for achieving the desired heat transfer rate. Fly ash exiting the cyclone is collected using conventional fabric filters in a baghouse having 10 compartments.

EXAMPLE 2

The CFBC reactor described in Example 1 was utilized wherein fly ash from 3 of the 10 baghouse compartments was diverted into a cyclone wherein the larger particles were captured and recycled into the combustion zone. A fraction of fine particles were not captured by the cyclone and were collected utilizing conventional techniques. More particularly, fly ash was pneumatically conveyed into the combustion zone on a semi-continuous basis wherein the transfer was controlled by conventional means. The term, semi-continuous, means that the entire contents of the baghouse compartments were diverted into the cyclone at predetermined intervals.

The benefits obtained by practicing the invention enumerated in Example 2 are disclosed in Table 1. Table 1 presents a comparison of pertinent data comprising the average of daily average values stored on the plant computer. Period 1 represents average values taken during a 12 day period wherein fly ash was semi-continuously recycled according to Example 2. Period 2 represents the embodiment according to Example 2 wherein the effectiveness of the fly ash recycle was partially reduced by reprogramming the control system which establishes the timing cycle for reinjecting fly ash back into the combustion zone. Data presented under Period 2 represents an average of the daily averages collected over a 19 day period although the average data from 3 days was excluded because of short plant outages on those days.

TABLE 1

Benefits Obtained by Utilizing Flyash Recycle In CFBC Reactors

| Period | 1 | 2 |
|---|---|---|
| Steam Rate, (mLBS/Hr) | 482.7 | 486.8 |
| Combustion Zone Temperature (°F.) | 1678 | 1718 |
| Cyclone Temperature (°F.) | 1568 | 1601 |
| Average Temperature (°F.) | 1623 | 1659.5 |
| Water Temperature (°F.) | 607 | 607 |
| Available Temp. Diff. (°F.) | 1016 | 1052.5 |
| Increase in Temp. Diff. (%) | — | 3.6 |
| Heat Transfer Coefficient (%) | 34.75 | 33.57 |
| Coefficent (BTU/hr-ft$^2$-F°) | | |
| Increase in Heat Transfer Coefficient (%) | 3.5 | — |
| Upper Pressure Differential (in H$_2$O) | 2.37 | 2.01 |
| Lower Pressure Differential (in H$_2$O) | 13.33 | 11.72 |

As illustrated in Period 2 of Table 1, the limited or restricted recycle of flyash resulted in only a 0.8% increase in steam rate even though the available temperature difference within the reactor (calculated by the difference of the average reactor temperature and the temperature of the water in the cooling tubes) increased by 3.6%. This loss of efficiency occurs due to a diminution in particle bed density which resulted in decreased heat transfer between the heated particles and the water in the cooling tubes surrounding the combustion zone. A similar decrease in efficiency was observed when the heat transfer coefficient for Period 2 (limited fly ash recycle) was compared with that disclosed in Period 1 (semi-continuous recycle). The increased reactor efficiency during Period 1 was confirmed by measuring the pressure differential at upper and lower zones within the combustion reactor as noted in Table 1.

Example 2 demonstrates that the recycling of fly ash increases the solids loading at all heights in the combustion zone and is effective in maintaining the reactor temperature within the predetermined temperature range. The following calculations quantify the improvements afforded by practicing the present invention. Assuming a constant cyclone efficiency of 0.9995, the reactor bed density can be increased to the extent desired by recycling a predetermined percentage of fly ash particles into the combustion zone as shown in Table 2. For example, the recycling of 20 percent of the fly ash recovered from the flue gas exiting the cyclone results in a 25 percent increase in the volume of particles residing in the combustion zone. The introduction of recycled fly ash into the combustion zone reduces the overall fuel requirements for operating the reactor and substantially reduces costs associated with disposal of fly ash.

TABLE 2

EFFECT OF FLY ASH RECYCLE ON REACTOR BED DENSITY

| Percent of Fly Ash Recycle | Percent Increase in Reactor Solids |
|---|---|
| 0 | 0 |
| 5 | 5 |
| 10 | 11 |
| 20 | 25 |
| 50 | 100 |
| 75 | 300 |

The cyclone separation efficiency of the fly ash will probably not be equal to the overall cyclone separation efficiency. However, the process according to the present invention has been calculated to provide separation efficiencies of greater than 99%. The effect on bed solids assuming a 50% fly ash recycle is shown in Table 3.

TABLE 3

EFFECT OF CYCLONE EFFICIENCY ON REACTOR BED DENSITY

| Cyclone Efficiency for Fly Ash | Percent Increase in Reactor Solids |
|---|---|
| .9995 | 100 |
| .999 | 50 |
| .995 | 10 |
| .99 | 5 |
| .95 | 1 |
| .9 | 0.5 |

Fly ash recycling provides a moderate increase in the amount of bed solids which results in a higher bed pressure drop and reduced blower capacity. Moreover the increased bed load places additional requirements on the fly ash recovery system. For example, a 50% recycle on fly ash will double the solids handling duty of the baghouse. Therefore, the baghouse will be required to perform extra duty to effect the recycling of fly ash according to the present invention.

The present process provides enhanced control of reactor bed quality while minimizing the erosion of reactor surfaces. It is known in the art that the rate of erosion in CFBC reactors is related to particle size with larger particles contributing to a greater extent than small particles at eroding reactor surfaces. Fly ash particles have a substantially smaller average size than the average particle size of the particles produced by combustion of the solid hydrocarbon fuel source. Therefore, the maintenance of a large quantity of the smaller fly ash particles within the combustion zone minimizes the erosion of the reactor surfaces.

The process according to the present invention produces ash having a lower carbon content which results in higher carbon utilization and a potentially more salable by-product. The process can also be operated utilizing low sulfur, low ash coals which generally do not product enough ash to develop a stable combustion bed. Moreover, flyash recycling reduces the amount of fly ash that must ultimately be disposed in an environmentally sound manner.

Having thus described the present invention, what is now deemed appropriate for Letters Patent of the United States is set out in the following appended claims.

What is claimed is:

1. A process for combusting a solid hydrocarbon fuel in a fluidized bed combustion reactor having a plurality of adjoining cooling tubes which surround a combustion zone, said process comprising:

(a) introducing the solid hydrocarbon fuel and an oxygen-containing gas into the combustion zone;

(b) combusting the fuel in the presence of the oxygen-containing gas within a predetermined temperature range thereby forming hot exhaust gases containing solid particles;

(c) discharging the hot exhaust gases containing the solid particles from the combustion zone and cooling the exhaust gases by indirect heat exchange against the cooling tubes;

(d) separating the resultant cooled solid particles into at least a first portion which is recycled into the combustion zone and a second portion having an average particle size smaller than the first portion containing substantially flyash;

(e) separating the second portion into an exhaust gas stream substantially free of flyash and a recycle flyash stream;

(f) recycling a portion of the recylce flyash stream into the combustion zone at an effective rate so as to maintain the predetermined temperature range within the combustion zone; and (g) venting the gas stream which is substantially free of solid particles.

2. The process according to claim 1 further comprising separating a fine fraction of particles from the concentrated stream of particles prior to recycling the concentrated stream of particles into the combustion zone according to step (f) and discarding the fine fraction of particles.

3. The process according to claim 1 wherein the solid hydrocarbon fuel is selected from wood, peat, coke or coal.

4. The process according to claim 3 wherein the solid hydrocarbon fuel is coal.

5. The process according to claim 1 further comprising cooling the concentrated stream of particles by indirect heat exchange with a process stream prior to recycling into the combustion zone.

6. The process according to claim 1 wherein the predetermined temperature range according to step (e) ranges from 1550° to 1650° F.

* * * * *